United States Patent
Rowan et al.

(10) Patent No.: US 11,775,858 B2
(45) Date of Patent: Oct. 3, 2023

(54) RUNTIME PARAMETER SELECTION IN SIMULATIONS

(71) Applicant: Schlumberger Technology Corporation, Sugar Land, TX (US)

(72) Inventors: David Rowan, Abingdon (GB); Tom Jonsthovel, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 792 days.

(21) Appl. No.: 16/306,891

(22) PCT Filed: Jun. 13, 2016

(86) PCT No.: PCT/US2016/037127
§ 371 (c)(1),
(2) Date: Dec. 3, 2018

(87) PCT Pub. No.: WO2017/217957
PCT Pub. Date: Dec. 21, 2017

(65) Prior Publication Data
US 2021/0033748 A1 Feb. 4, 2021

(51) Int. Cl.
*G06N 20/00* (2019.01)
*G06F 30/20* (2020.01)
(Continued)

(52) U.S. Cl.
CPC .......... *G06N 20/00* (2019.01); *G01V 99/005* (2013.01); *G06F 30/20* (2020.01); *G06F 30/27* (2020.01);
(Continued)

(58) Field of Classification Search
None
See application file for complete search history.

(56) References Cited

U.S. PATENT DOCUMENTS

| 8,818,777 | B2 * | 8/2014 | Howell | ................... E21B 49/00 703/10 |
| 11,604,909 | B2 * | 3/2023 | Sun | ......................... G06F 30/27 |

(Continued)

OTHER PUBLICATIONS

S. Ferrari and R. F. Stengel, "Smooth function approximation using neural networks," in IEEE Transactions on Neural Networks, vol. 16, No. 1, pp. 24-38, Jan. 2005, doi: 10.1109/TNN.2004.836233 (Year: 2005).*

(Continued)

*Primary Examiner* — Akash Saxena
(74) *Attorney, Agent, or Firm* — Jeffrey D. Frantz

(57) ABSTRACT

A method for performing a field operation of a field. The method includes obtaining historical parameter values of a runtime parameter and historical core datasets, where the historical parameter values and the historical core datasets are used for a first simulation of the field, and where each historical parameter value results in a simulation convergence during the first simulation, generating a machine learning model based at least on the historical core datasets and the historical parameter values, obtaining, during a second simulation of the field, a current core dataset, generating, using the machine learning model and based on the current core dataset, a predicted parameter value of the runtime parameter for achieving the simulation convergence during the second simulation, and completing, using at least the predicted parameter value, the second simulation to generate a modeling result of the field.

19 Claims, 7 Drawing Sheets

(51) Int. Cl.
    *G06F 30/28*     (2020.01)
    *G01V 99/00*     (2009.01)
    *G06F 30/27*     (2020.01)
    *G06F 113/08*     (2020.01)

(52) U.S. Cl.
    CPC .......... *G06F 30/28* (2020.01); *G06F 2113/08* (2020.01)

(56) References Cited

U.S. PATENT DOCUMENTS

| | | | | |
|---|---|---|---|---|
| 2010/0082142 A1* | 4/2010 | Usadi | .................. | G06F 30/23 700/104 |
| 2010/0088076 A1* | 4/2010 | Koutsabeloulis | ....... | E21B 43/00 703/2 |
| 2012/0191439 A1* | 7/2012 | Meagher | ................. | G06F 30/20 703/18 |
| 2012/0232859 A1* | 9/2012 | Pomerantz | ............. | G01V 1/282 703/2 |
| 2013/0096898 A1* | 4/2013 | Usadi | ...................... | G06F 30/23 703/10 |
| 2013/0096899 A1* | 4/2013 | Usadi | ...................... | E21B 43/00 703/10 |
| 2013/0096900 A1* | 4/2013 | Usadi | ...................... | G06F 30/20 703/10 |
| 2013/0118736 A1* | 5/2013 | Usadi | .................. | G06N 3/0427 166/268 |
| 2013/0311158 A1* | 11/2013 | Dasari | .................... | G06F 30/20 703/10 |
| 2016/0078361 A1* | 3/2016 | Brueckner | ............. | G06N 20/00 706/12 |
| 2016/0179992 A1* | 6/2016 | Van der Velden | ...... | G06F 30/20 703/2 |
| 2016/0358099 A1* | 12/2016 | Sturlaugson | ........... | G06N 5/043 |
| 2018/0320493 A1* | 11/2018 | Ramsay | .................. | E21B 43/17 |
| 2019/0004484 A1* | 1/2019 | Cussonneau | ........... | G06F 30/20 |
| 2019/0212469 A1* | 7/2019 | Jonsthovel | .............. | G06F 30/20 |
| 2021/0019189 A1* | 1/2021 | Eker | ........................ | G06N 3/08 |
| 2021/0033748 A1* | 2/2021 | Rowan | .................... | G06F 30/27 |
| 2023/0104036 A1* | 4/2023 | Samson | .................. | G06F 30/28 703/6 |
| 2023/0116731 A1* | 4/2023 | Sheth | ..................... | G06F 30/27 703/6 |

OTHER PUBLICATIONS

International Preliminary Report on Patentability for the equivalent International patent application PCT/US2016/037127 dated Dec. 27, 2018.
International Search Report and Written Opinion for the equivalent International patent application PCT/US2016/037127 dated Mar. 13, 2017.
Exam Report issued in Canadian Patent Application No. 3027332 dated Aug. 18, 2022, 3 pages.

* cited by examiner

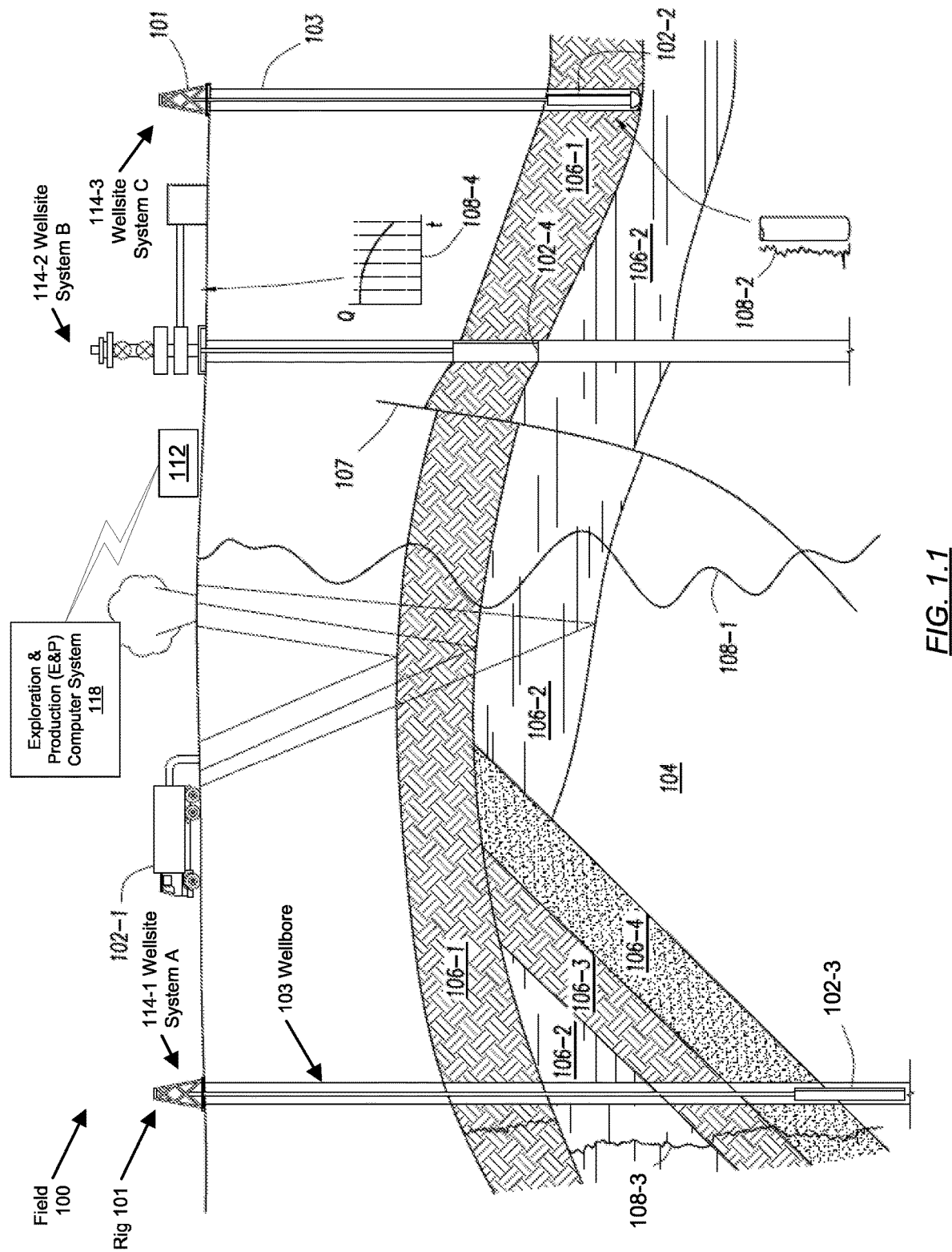
FIG. 1.1

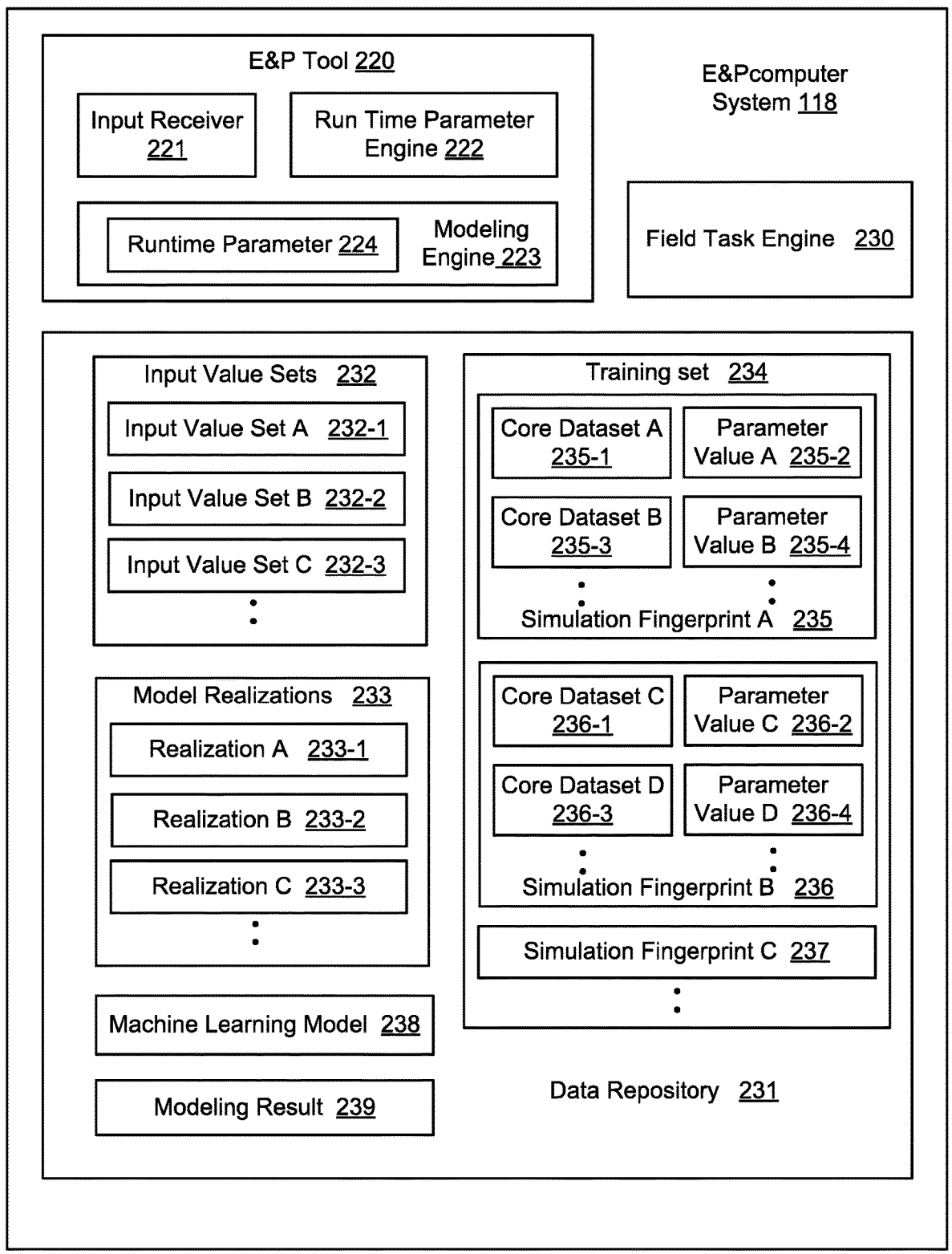
FIG. 1.2

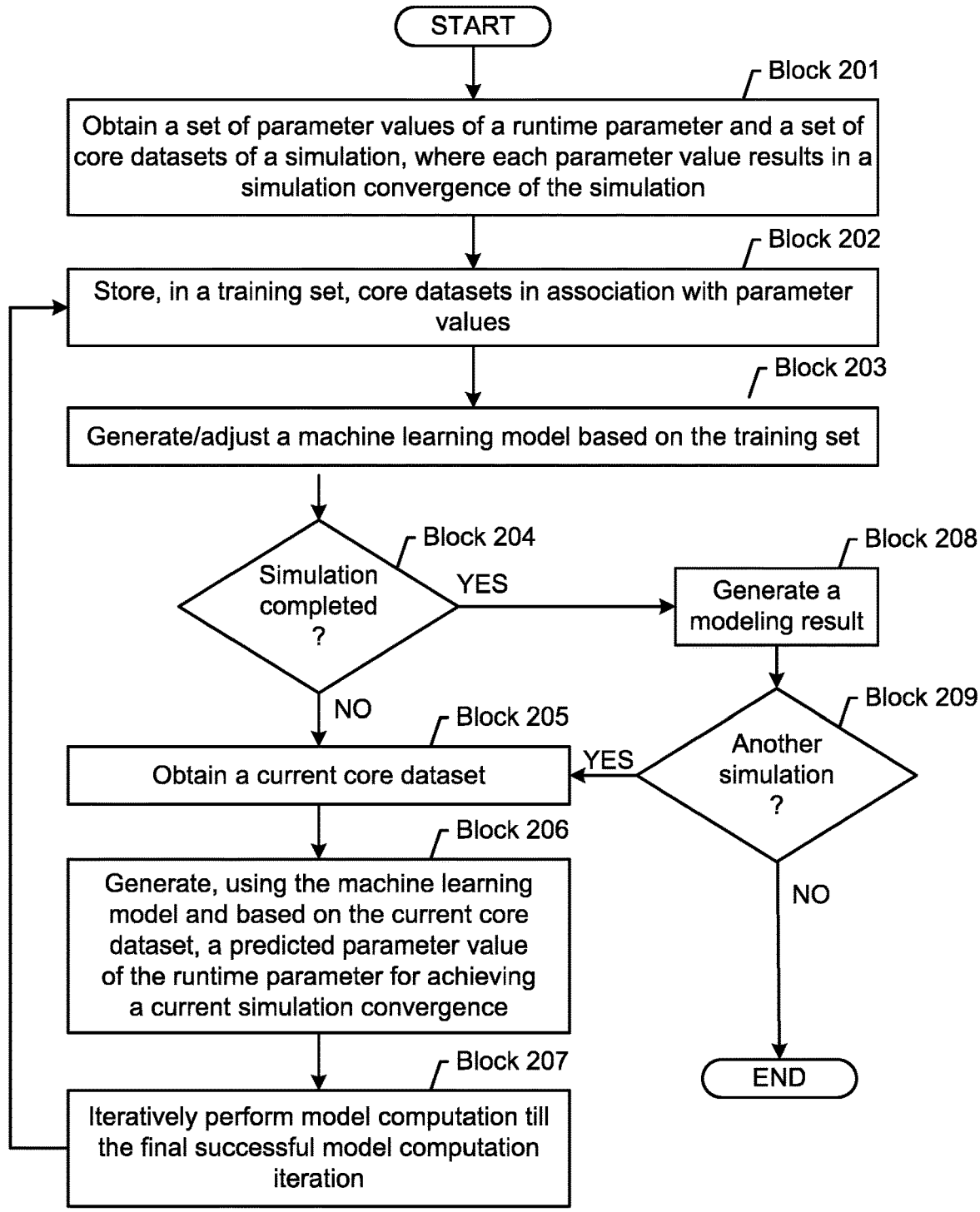
FIG. 2.1

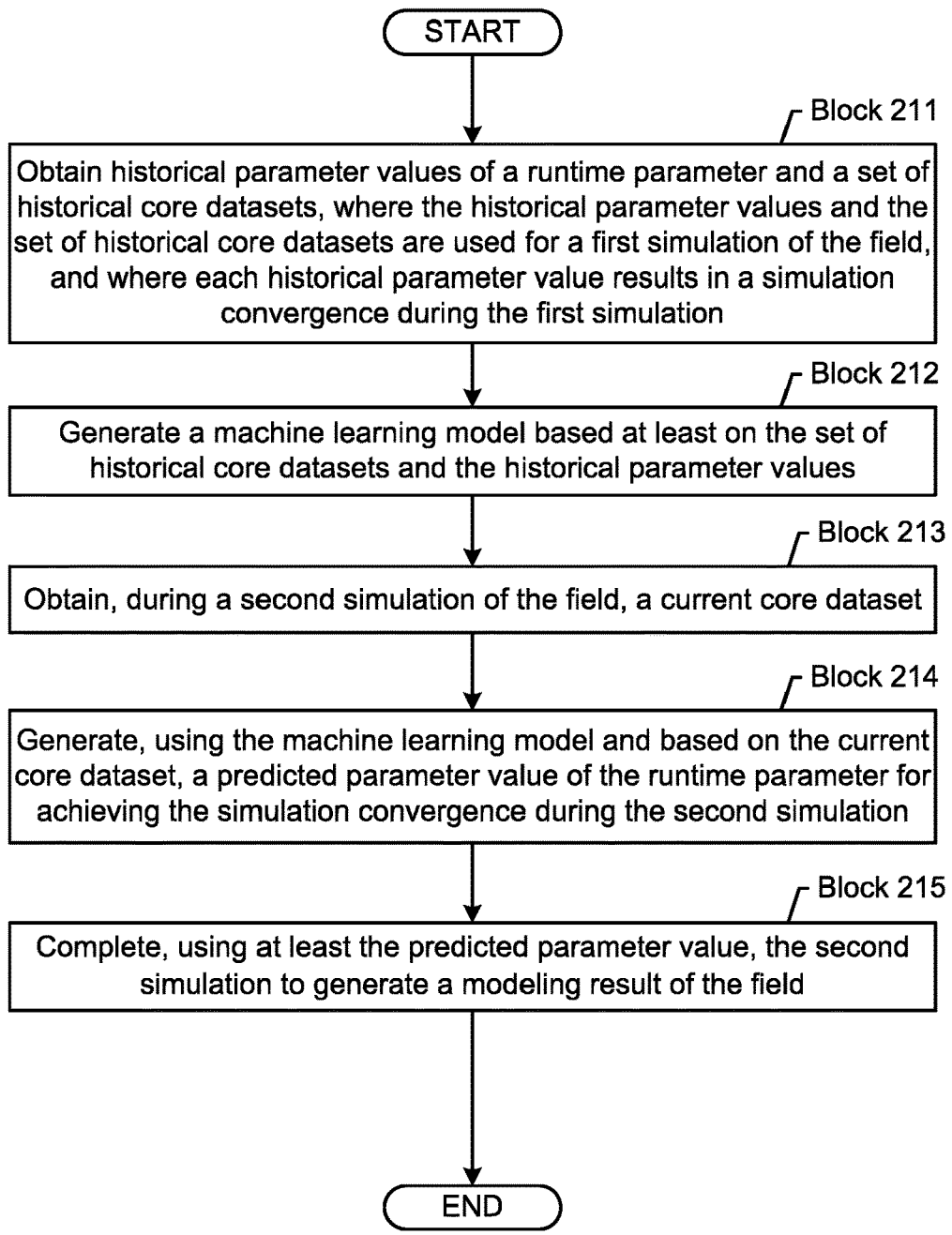
FIG. 2.2

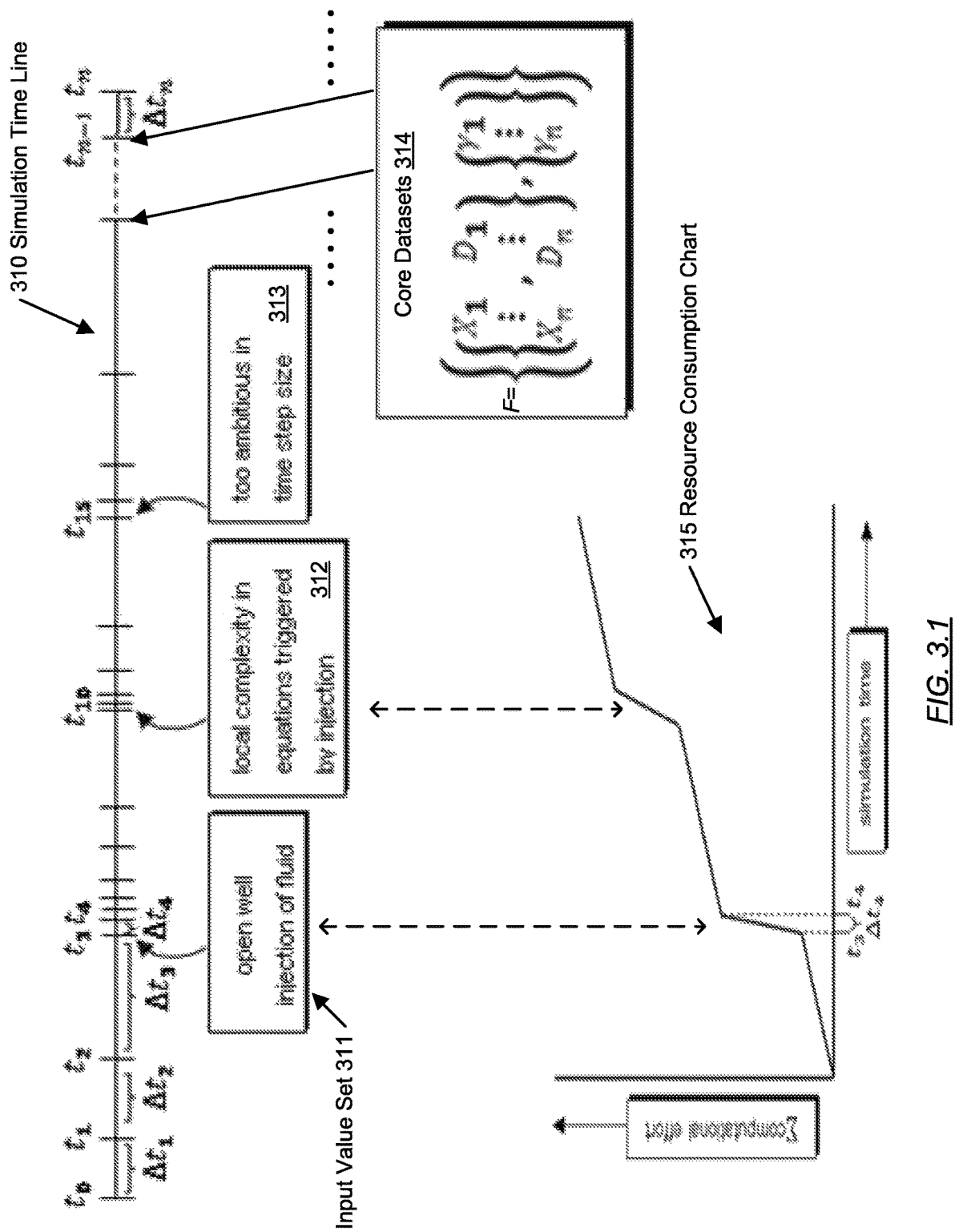
FIG. 3.1

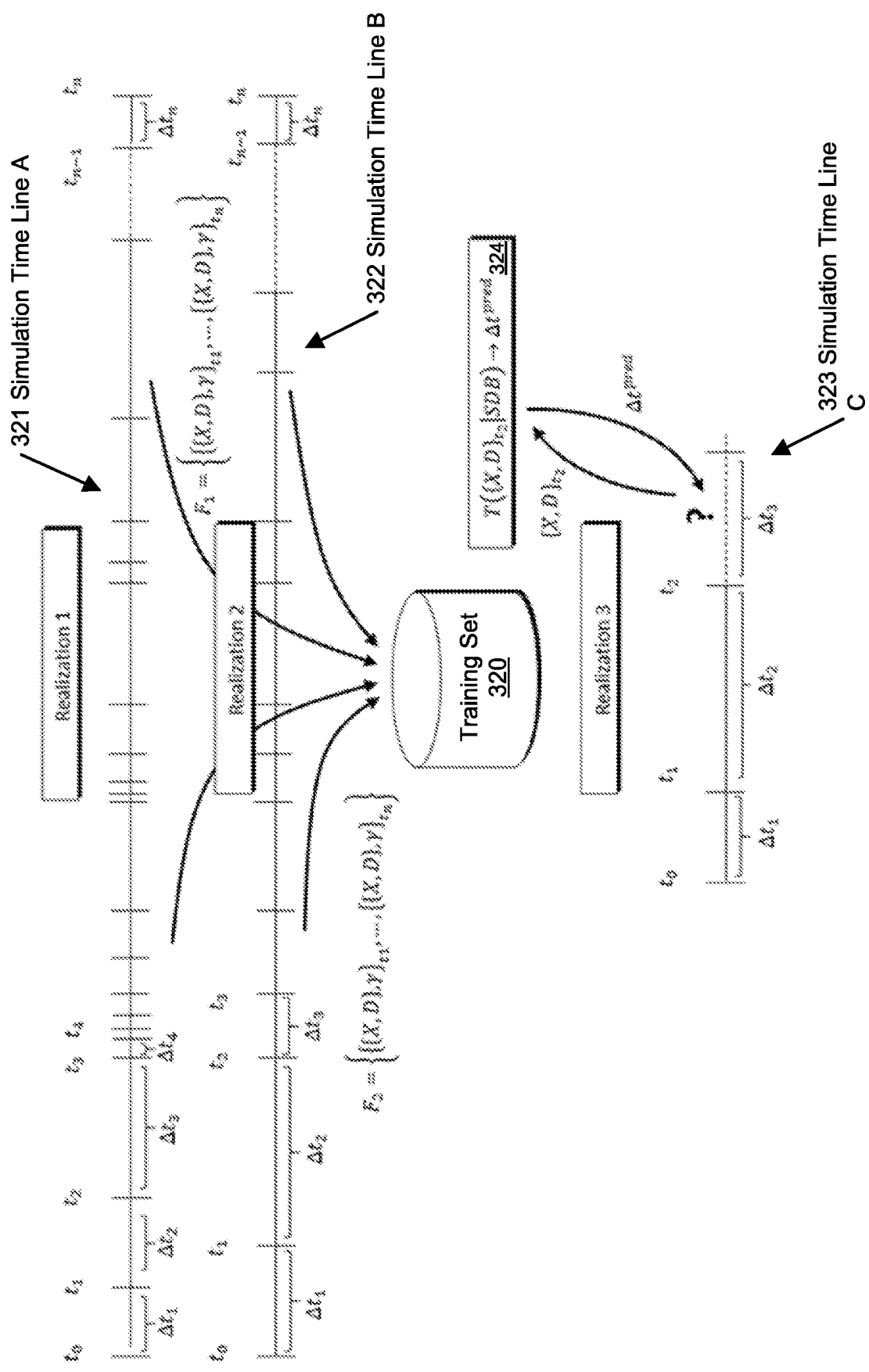
FIG. 3.2

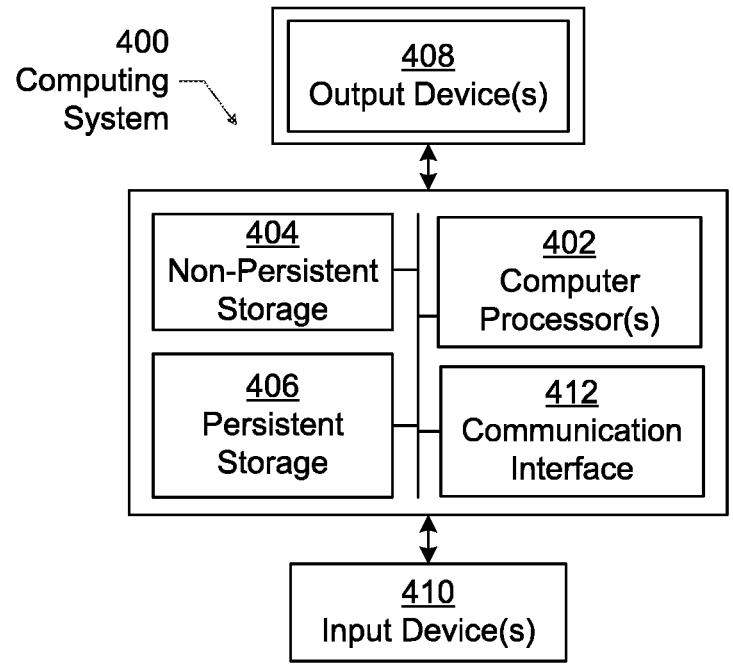
*FIG. 4.1*
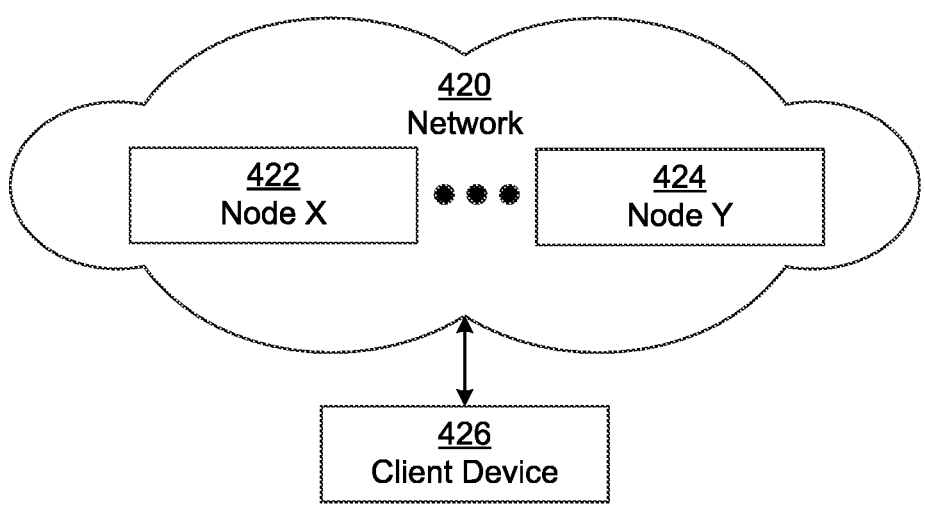
*FIG. 4.2*

RUNTIME PARAMETER SELECTION IN SIMULATIONS

BACKGROUND

In the oil and gas industry, modeling involves the construction of a computer model to represent a portion of a field (e.g., a reservoir, geologic basin, petroleum system, etc.) for the purposes of improving estimation of petroleum reserves and making decisions regarding the development of the field. The computer model represents the physical space of the reservoir, geologic basin, petroleum system, etc. by an array of discrete grid cells, delineated by a grid which may be regular or irregular. The array of grid cells may be three-dimensional, although one-dimensional or two-dimensional models are sometimes used. Values for attributes such as porosity, permeability and water saturation are associated with each grid cell. The value of each attribute is implicitly deemed to apply uniformly throughout the volume of the reservoir represented by the grid cell.

As an example, modeling may solve a complex set of non-linear partial differential equations that model the fluid flow in porous media over a sequence of simulation time points. The act of applying the computer model to solve the equations and generate resultant attribute values of the reservoir, geologic basin, petroleum system, etc. over the sequence of simulation time points is referred to as a simulation.

SUMMARY

In general, in one aspect, an embodiment of runtime parameter selection in simulations includes a method for performing a field operation of a field. The method includes obtaining historical parameter values of a runtime parameter and historical core datasets, where the historical parameter values and the historical core datasets are used for a first simulation of the field, and where each historical parameter value results in a simulation convergence during the first simulation, generating a machine learning model based at least on the historical core datasets and the historical parameter values, obtaining, during a second simulation of the field, a current core dataset, generating, using the machine learning model and based on the current core dataset, a predicted parameter value of the runtime parameter for achieving the simulation convergence during the second simulation, and completing, using at least the predicted parameter value, the second simulation to generate a modeling result of the field.

Other aspects will be apparent from the following description and the appended claims.

BRIEF DESCRIPTION OF DRAWINGS

The appended drawings illustrate several embodiments of runtime parameter selection in simulations and are not to be considered limiting of its scope, for runtime parameter selection in simulations may admit to other equally effective embodiments.

FIG. 1.1 is a schematic view, partially in cross-section, of a field in which one or more embodiments of runtime parameter selection in simulations may be implemented.

FIG. 1.2 shows a schematic diagram of a system in accordance with one or more embodiments.

FIG. 2.1 shows a flowchart of an example method in accordance with one or more embodiments.

FIG. 2.2 shows a flowchart of an example method in accordance with one or more embodiments.

FIGS. 3.1 and 3.2 show an example in accordance with one or more embodiments.

FIGS. 4.1 and 4.2 show computing systems in accordance with one or more embodiments.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that one or more embodiments may be practiced without these specific details. In other instances, well-known features have not been described in detail to avoid unnecessarily complicating the description.

In general, embodiments provide a method and system for performing a field operation based on modeling results of a numeric simulation. In one or more embodiments, historical parameter values of a runtime parameter and historical core datasets are obtained. For example, the historical parameter values and historical core datasets are used for a first simulation of the field where each historical parameter value results in a simulation convergence during the first simulation. A machine learning model is then generated based at least on the historical core datasets and the historical parameter values. Using the machine learning model and based on a current core dataset obtained during a second simulation of the field, a predicted parameter value of the runtime parameter is generated for achieving the simulation convergence during the second simulation. Accordingly, using at least the predicted parameter value, the second simulation is completed to generate a modeling result of the field.

One or more embodiments are directed to increasing efficiency of a computing system by using the above selection technique for runtime parameters for simulations. By using the selection technique for runtime parameters, the number of instructions of the computing device may be reduced resulting in a more efficient computing system.

FIG. 1.1 depicts a schematic view, partially in cross section, of a field (100) in which one or more embodiments of runtime parameter selection in simulations may be implemented. In one or more embodiments, one or more of the modules and elements shown in FIG. 1.1 may be omitted, repeated, and/or substituted. Accordingly, embodiments of runtime parameter selection in simulations should not be considered limited to the specific arrangements of modules shown in FIG. 1.1.

As shown in FIG. 1.1, the field (100) includes the subterranean formation (104), data acquisition tools (102-1), (102-2), (102-3), and (102-4), wellsite system A (114-1), wellsite system B (114-2), wellsite system C (114-3), a surface unit (112), and an exploration and production (E&P) computer system (118). The subterranean formation (104) includes several geological structures, such as a sandstone layer (106-1), a limestone layer (106-2), a shale layer (106-3), a sand layer (106-4), and a fault line (107). In particular, these geological structures form at least one reservoir containing fluids (e.g., hydrocarbon) as described below.

In one or more embodiments, data acquisition tools (102-1), (102-2), (102-3), and (102-4) are positioned at various locations along the field (100) for collecting data of the subterranean formation (104), referred to as survey operations. In particular, the data acquisition tools are adapted to measure the subterranean formation (104) and detect the characteristics of the geological structures of the subterranean formation (104). For example, data plots (108-1), (108-2), (108-3), and (108-4) are depicted along the field (100) to demonstrate the data generated by the data acquisition tools. Specifically, the static data plot (108-1) is a seismic two-way response time. Static data plot (108-2) is core sample data measured from a core sample of the subterranean formation (104). Static data plot (108-3) is a logging trace, referred to as a well log. Production decline curve or graph (108-4) is a dynamic data plot of the fluid flow rate over time. Other data may also be collected, such as historical data, analyst user inputs, economic information, and/or other measurement data and other parameters of interest.

Further as shown in FIG. 1.1, each of the wellsite system A (114-1), wellsite system B (114-2), and wellsite system C (114-3) is associated with a rig, a wellbore, and other wellsite equipment configured to perform wellbore operations, such as logging, drilling, fracturing, production, or other applicable operations. For example, the wellsite system A (114-1) is associated with a rig (101), a wellbore (103), and drilling equipment to perform drilling operation. Similarly, the wellsite system B (114-2) and wellsite system C (114-3) are associated with respective rigs, wellbores, other wellsite equipments, such as production equipment and logging equipment to perform production operations and logging operations, respectively. Generally, survey operations and wellbore operations are referred to as field operations of the field (100). In addition, data acquisition tools and wellsite equipments are referred to as field operation equipments. The field operations are performed as directed by a surface unit (112). For example, the field operation equipment may be controlled by a field operation control signal that is sent from the surface unit (112).

In one or more embodiments, the surface unit (112) is operatively coupled to the data acquisition tools (102-1), (102-2), (102-3), (102-4), and/or the wellsite systems. In particular, the surface unit (112) is configured to send commands to the data acquisition tools (102-1), (102-2), (102-3), (102-4), and/or the wellsite systems and to receive data therefrom. In one or more embodiments, the surface unit (112) may be located at the wellsite system A (114-1), wellsite system B (114-2), wellsite system C (114-3), and/or remote locations. The surface unit (112) may be provided with computer facilities (e.g., an E&P computer system (118)) for receiving, storing, processing, and/or analyzing data from the data acquisition tools (102-1), (102-2), (102-3), (102-4), the wellsite system A (114-1), wellsite system B (114-2), wellsite system C (114-3), and/or other parts of the field (100). The surface unit (112) may also be provided with or have functionally for actuating mechanisms at the field (100). The surface unit (112) may then send command signals to the field (100) in response to data received, stored, processed, and/or analyzed, for example to control and/or optimize various field operations described above.

In one or more embodiments, the surface unit (112) is communicatively coupled to the E&P computer system (118). In one or more embodiments, the data received by the surface unit (112) may be sent to the E&P computer system (118) for further analysis. Generally, the E&P computer system (118) is configured to analyze, model, control, optimize, or perform management tasks of the aforementioned field operations based on the data provided from the surface unit (112). In one or more embodiments, the E&P computer system (118) is provided with functionality for manipulating and analyzing the data, such as performing simulation, planning, and optimization of production operations of the wellsite system A (114-1), wellsite system B (114-2), and/or wellsite system C (114-3). In one or more embodiments, the result generated by the E&P computer system (118) may be displayed for an analyst user to view the result in a two dimensional (2D) display, three dimensional (3D) display, or other suitable displays. Although the surface unit (112) is shown as separate from the E&P computer system (118) in FIG. 1.1, in other examples, the surface unit (112) and the E&P computer system (118) may also be combined.

Although FIG. 1.1 shows a field (100) on the land, the field (100) may be an offshore field. In such a scenario, the subterranean formation may be in the sea floor. Further, field data may be gathered from the field (100) that is an offshore field using a variety of offshore techniques for gathering field data.

FIG. 1.2 shows more details of the E&P computer system (118) in which one or more embodiments of runtime parameter selection in simulations may be implemented. In one or more embodiments, one or more of the modules and elements shown in FIG. 1.2 may be omitted, repeated, and/or substituted. Accordingly, embodiments of runtime parameter selection in simulations should not be considered limited to the specific arrangements of modules shown in FIG. 1.2.

As shown in FIG. 1.2, the E&P computer system (118) includes an E&P tool (220), a data repository (231) for storing input data, intermediate data, and resultant outputs of the E&P tool (220), and a field task engine (230) for performing various tasks of the field operation. In one or more embodiments, the data repository (231) may include one or more disk drive storage devices, one or more semiconductor storage devices, other suitable computer data storage devices, or combinations thereof. In one or more embodiments, content stored in the data repository (231) may be stored as a data file, a linked list, a data sequence, a database, a graphical representation, any other suitable data structure, or combinations thereof.

In one or more embodiments, the content stored in the data repository (231) includes the input value sets (232), model realizations (233), training set (234), machine learning model (238), and modeling result (239).

In one or more embodiments, each of the input value sets (232) includes a set of simulation input values corresponding to input parameters for modeling the field (100). In one or more embodiments, the input parameters include one or more of a boundary condition (e.g., pressure, temperature, saturation, etc.), rock parameter (e.g., porosity, permeability, maturity, thermal conductivity, etc.), pore fluid data (e.g., viscosity, fluid density, fluid kinetics, temperature, saturation, number of moles of hydrocarbons and water in place, etc.), well trajectories, layer and fault geometry (e.g., layer thickness, etc.), and fault parameter (e.g., capillary pressure, etc.) associated with the field (100). In one or more embodiments, the input values are assigned to an input value set based on a user input and/or field measurements to model the field (100). For example, at least a portion of the assigned values are based on measurements obtained from the data acquisition tools depicted in FIG. 1.1 above. In one or more embodiments, at least a portion of the input parameters may be assigned different values among multiple sets of input values (e.g., input value set A (232-1), input value set B (232-2), input value set C (232-3), etc.). In one or more embodiments, the input value set A (232-1), input value set B (232-2), and input value set C (232-3) relate to a single portion of the field (100) that is evaluated by multiple simulations referred to as a simulation study. In one or more embodiments, the input value set A (232-1), input value set B (232-2), and input value set C (232-3) relate to different portions of the field (100) that are evaluated by multiple simulation studies. In one or more embodiments, the input value set A (232-1), input value set B (232-2), and input value set C (232-3) are used in multiple simulations or multiple simulation studies to generate different model realizations (e.g., realization A (233-1), realization B (233-2), realization C (233-3)) described below. Specifically, a model realization is a collection of computing data of the simulation based on a single input data set.

In one or more embodiments, each of the model realizations (233) (e.g., realization A (233-1), realization B (233-2), realization C (233-3), etc.) includes a three-dimensional (3D) volume (not shown) that represents a portion of the field (100). For example, the 3D volume may represent a portion of the subterranean formation (104) depicted in FIG. 1.1 above. In one or more embodiments, the 3D volume is associated with a grid having a large number (e.g., thousands, hundreds of thousand, millions, etc.) of grid points corresponding to locations in the subterranean formation (104). In one or more embodiments, the realization A (233-1), realization B (233-2), realization C (233-3), etc. include a single 3D volume and a single grid that are shared among these model realizations to represent the same portion of the field (100). In one or more embodiments, the realization A (233-1), realization B (233-2), realization C (233-3), etc. include multiple 3D volumes, each associated with a respective grid, that represent different portions of the field (100).

In one or more embodiments, each model realization (e.g., realization A (233-1), realization B (233-2)) further includes information assigned to each grid point to describe characteristics, operations, or other behaviors of a corresponding location in the field (100). In other words, each grid point has a unique corresponding location in the field, and the information assigned to the grid point is a value of a property of the corresponding location. The information assigned to the grid points may include the input values (referred to as the simulation input data) in an input value set and/or a simulated result (referred to as the simulation output data) computed at each simulation time point using a simulator. For example, the realization A (233-1) may include the input value set A (232-1) and porosity or pore pressure values derived from the input value set A (232-1) at one or more simulation time points by the simulator. Similarly, the realization B (233-2) may include the input value set B (232-2) and porosity or pore pressure values derived from the input value set B (232-2) at one or more simulation time points by the simulator. In one or more embodiments, the 3D volume and the simulation input and/or output data assigned to grid points of the 3D volume for a particular simulation time point form a core dataset as part of the model realization. Accordingly, each of the model realizations (233) (e.g., realization A (233-1), realization B (233-2), realization C (233-3), etc.) includes one or more core datasets corresponding to one or more simulation time points of a corresponding simulation. In one or more embodiments, the core dataset of each simulation time point of the simulation is included in the mode realization (e.g., realization A (233-1), realization B (233-2), realization C (233-3), etc.) of the simulation.

In one or more embodiments, the training set (234) includes simulation fingerprints (e.g., simulation fingerprint A (235), simulation fingerprint B (236), simulation fingerprint C (237), etc.). Each simulation fingerprint represents characteristics of a realization and includes one or more core datasets and corresponding runtime parameter values. For example, the simulation fingerprint A (235), simulation fingerprint B (236), and simulation fingerprint C (237) correspond to the realization A (233-1), realization B (233-2), and realization C (233-3), respectively. In particular, the core dataset A (235-1) may include a portion of simulation input/output data, of the realization A (233-1), at a particular simulation time point. The parameter value A (235-2) is a runtime parameter value used to generate the simulation output data, of the realization A (233-1), at the particular simulation time point. Similarly, the core dataset B (235-3) may include a portion of simulation input/output data, of the realization A (233-1), at a different simulation time point. The parameter value B (235-4) is another runtime parameter value used to generate the simulation output data, of the realization A (233-1), at this different simulation time point.

In contrast, the core dataset C (236-1) may include a portion of simulation input/output data, of the realization B (233-2), at a particular simulation time point. The parameter value C (236-2) is a runtime parameter value used to generate the simulation output data, of the realization B (233-2), at the particular simulation time point. Similarly, the core dataset D (236-3) may include a portion of simulation input/output data, of the realization B (233-2), at a different simulation time point. The parameter value D (236-4) is another runtime parameter value used to generate the simulation output data, of the realization B (233-2), at this different simulation time point. In one or more embodiments, the parameter value A (235-2), parameter value B (235-4), parameter value C (236-2), and parameter value D (236-4) are values for the runtime parameter (224) of the modeling engine (223) described below. An example of core datasets and the parameter values is described in reference to FIGS. 3.1 and 3.2 below.

In one or more embodiments, the machine learning model (238) is a computer model of statistical relationships between the core datasets (e.g., core dataset A (235-1), core dataset B (235-3), core dataset C (236-1), core dataset D (236-3), etc.) and the runtime parameter values (e.g., parameter value A (235-2), parameter value B (235-4), parameter value C (236-2), parameter value D (236-4), etc.). In particular, the machine learning model (238) is distinct from the computer model used by the simulator to represent a portion of the field. In one or more embodiment, the machine learning model (238) includes a runtime parameter value selection algorithm, which is a statistical classifier to identify a target value of the runtime parameter for a subsequent simulation time point. In one or more embodiments, the machine learning model (238) is generated based on the training set (234) using machine learning techniques.

In one or more embodiments, the modeling result (239) is generated at the end of the simulation and includes simulation output data as well as a summary, statistic, conclusion, decision, plan, etc. derived from the simulation output data.

In one or more embodiments, the E&P tool (220) includes the input receiver (221), the runtime parameter engine (222), and the modeling engine (223). Each of these components of the E&P tool (220) is described below.

In one or more embodiments, the input receiver (221) is configured to obtain the input value sets (232) for analysis by the runtime parameter engine (222) and the modeling engine (223). In one or more embodiments, the input receiver (221) obtains at least a portion of the input value sets (232) from a user. In other words, the portion of the input value sets (232) is specified by the user. In one or more embodiments, the input receiver (221) obtains the input value sets (232), at least in part, from the surface unit (112) depicted in FIG. 1.1 above. For example, the input receiver (221) may obtain one or more portions of the input value sets (232) from the surface unit (112) intermittently, periodically, in response to a user activation, or as triggered by an event. Accordingly, the intermediate and final results of the runtime parameter engine (222) and the modeling engine (223) may be generated intermittently, periodically, in response to a user activation, or as triggered by an event.

In one or more embodiments, the runtime parameter engine (222) is configured to generate the training set (234) based on the model realizations (233) and in turn generate the machine learning model (238) based on the training set (234). In one or more embodiments, the runtime parameter engine (222) is further configured to identify, based on a core dataset of a current simulation time point, a target value of a runtime parameter (e.g., runtime parameter (224) of the modeling engine (223) described below) for use in a subsequent simulation time point. The target value is a predicted value for achieving a simulation convergence (described below) at the subsequent simulation time point. In one or more embodiments, the runtime parameter engine (222) generates the training set (234), the machine learning model (238), and the target value of the runtime parameter (224) using the method described in reference to FIG. 2 below.

In one or more embodiments, the modeling engine (223) is configured to perform modeling of the field (100) to generate the model realizations (233) and the modeling result (239). Modeling is a technique to represent and simulate characteristics, operations, and other behaviors of at least a portion of a field (e.g., the field (100), subterranean formation (104), wellsite system A (114-1), etc.) using mathematical and physical rules. The modeling result (239) may include a value related to the characteristics, operations, and other behaviors of the field (100) that is derived using such mathematical and physical rules. Basin modeling (or basin simulation) is a technique for modeling geological processes that may have occurred in sedimentary basins over geological times. In one or more embodiments, the basin modeling includes petroleum system modeling that simulates the events leading to generation, migration and accumulation of hydrocarbons in reservoir rocks. In one or more embodiments, the modeling further includes reservoir modeling, such as performing simulation, planning, and optimization of exploratory and/or production operations of one or more reservoirs in the field (100) depicted in FIG. 1.1 above.

In one or more embodiments, the modeling engine (223) generates the model realizations (233) and the modeling results (239) based on the input value sets (232) according to the aforementioned mathematical and physical laws. For example, the modeling engine (223) generates the model realizations (233) and the modeling results (239) using a simulator (not shown). Specifically, the modeling may be performed using computer software, hardware, or a combination of software and hardware, which are referred to as simulators. The simulators are equipped with many different runtime parameters to optimize the settings of the equation solvers and the simulation time steps defining the sequence of simulation time points. Examples of the runtime parameters include the predicted target time step value, the variable value thresholds, the tolerance of allowed error in the solution, and the maximum number of solver iterations or the type of solver. In one or more embodiments, the modeling engine (223) includes the runtime parameter (224) to control runtime performance of the simulator (not shown).

As noted above, the simulator solves the mathematical equations over a sequence of simulation time points to perform a simulation. An example is shown in FIG. 3.1 below. Specifically, FIG. 3.1 shows a simulation time line (310) having points in time (i.e., simulation time points) denoted as $t_i$ (e.g., $t_0, t_1, t_2, t_3, t_4, \ldots, t_{10}, \ldots, t_{15}, \ldots, t_{n-1}, t_n$, etc.) and the corresponding time steps denoted as $t_j$ (e.g., $t_1, t_2, t_3, t_4, \ldots, t_n$, etc.) where $t_i = t_{i-1} + t_j$. As an example, the simulation time line (310) represents a simulation of fluid flow in porous media starting from the initial simulation time $t_0$ till the ending simulation time $t_n$. At each time point $t_i$, model computation is performed iteratively, till a convergence condition is met, to solve the equations that model the fluid flow in the porous media. In particular, each time point $t_i$ corresponds to a successful model computation that is completed with one or more iterations. Specifically, the successful model computation is based on meeting the convergence condition, which is referred to as a simulation convergence.

Upon successful model computation at the time point $t_i$, a runtime parameter value (e.g., time step $t_{i+1}$) is determined to continue simulation for the next time point $t_{i+1}$. The simulation is continued in the manner described above till the ending simulation time $t_n$. Accordingly, the simulator aggregates the results of the successful model computations over the sequence of simulation time points to generate a single realization (e.g., realization A (233-1), realization B (233-2), realization C (233-3), etc.) of the simulation. As noted above, a variety of different input data sets (e.g., input value set A (232-1), input value set B (232-2), input value set C (232-3), etc.) may be used to perform multiple simulations and generate multiple realizations (e.g., model realizations (233)) in a simulation study. In one or more embodiments, the modeling engine (223) configures the runtime parameter (224) to generate the model realizations (233) and the modeling results (239) using the method described in reference to FIG. 2 below.

Returning to the discussion of FIG. 1.2, in one or more embodiments, the result generated by the E&P computer system (118) may be displayed to a user using a two dimensional (2D) display, three dimensional (3D) display, or other suitable displays. For example, the modeling result (239) may be used by the user to predict hydrocarbon content throughout portions of the field (100) and to facilitate drilling, fracturing, or other exploratory and/or production operations of the field (100).

In one or more embodiments, the E&P computer system (118) includes the field task engine (230) that is configured to generate a field operation control signal based at least on a result generated by the E&P tool (220), such as based on the model realizations (233) and/or the modeling result (239). As noted above, the field operation equipment depicted in FIG. 1.1 above may be controlled by the field operation control signal. For example, the field operation control signal may be used to control drilling equipment, an actuator, a fluid valve, or other electrical and/or mechanical devices disposed about the field (100) depicted in FIG. 1.1 above.

The E&P computer system (118) may include one or more system computers, such as shown in FIGS. 4.1 and 4.2 below, which may be implemented as a server or any conventional computing system. However, those skilled in the art, having benefit of this disclosure, will appreciate that implementations of various technologies described herein may be practiced in other computer system configurations, including hypertext transfer protocol (HTTP) servers, handheld devices, multiprocessor systems, microprocessor-based or programmable consumer electronics, network personal computers, minicomputers, mainframe computers, and the like.

While specific components are depicted and/or described for use in the units and/or modules of the E&P computer system (118) and the E&P tool (220), a variety of components with various functions may be used to provide the formatting, processing, utility and coordination functions for the E&P computer system (118) and the E&P tool (220). The components may have combined functionalities and may be implemented as software, hardware, firmware, or combinations thereof.

FIG. 2.1 depicts an example method in accordance with one or more embodiments. For example, the method depicted in FIG. 2.1 may be practiced using the E&P computer system (118) described in reference to FIGS. 1.1 and 1.2 above. In one or more embodiments, one or more of the elements shown in FIG. 2.1 may be omitted, repeated, and/or performed in a different order. Accordingly, embodiments of runtime parameter selection in simulations should not be considered limited to the specific arrangements of elements shown in FIG. 2.1.

In Block 201, a set of historical parameter values of a runtime parameter and a set of historical core datasets are obtained. In particular, the set of historical parameter values and the set of historical core datasets relate to a simulation of the field. In one or more embodiments, each historical core dataset is obtained from a successful model computation of the simulation at a particular simulation time point. Further, a corresponding historical parameter value is used for a subsequent successful model computation at the next simulation time point immediately following the particular simulation time point. Specifically, each historical parameter value results in a simulation convergence during the simulation.

In Block 202, the set of historical core datasets in association with the corresponding historical parameter values are stored in a training set. In one or more embodiments, in the training set, a historical core dataset obtained from a successful model computation at a particular simulation time point is linked with a corresponding historical parameter value used for a subsequent successful model computation at the next simulation time point immediately following the particular simulation time point.

In Block 203, a machine learning model is generated based on the training set using machine learning techniques. In one or more embodiments, the machine learning model is generated based on the set of historical core datasets and the set of parameter values obtained in Block 201 above as well as additional core datasets and parameter values that are iteratively added to the training set. For example, the machine learning model may be initially generated based on the set of historical core datasets and the set of parameter values obtained in Block 201 above. Subsequently, the machine learning model may be iteratively adjusted each time an additional core dataset and corresponding parameter value are added to the training set.

In one or more embodiments, the machine learning techniques include performing statistical clustering of the core datasets in the training set to generate categories of the core datasets. As used herein, a category of the core datasets refers to a group of core datasets sharing a similarity that is identified by the machine learning techniques. The group of core datasets is considered as a cluster in the statistical clustering procedure. The parameter values linked to the portion of core datasets in each category are collected as a categorized parameter value set. Each categorized parameter value set is then analyzed to generate a target parameter value for the corresponding category. For example, the target parameter value may be randomly selected from values in the categorized parameter value set. In another example, the target parameter value may be an average, median, geometric mean, or other statistical representation of values in the categorized parameter value set. In one or more embodiments, the machine learning model includes the categorized core datasets where each categorized core dataset is linked with the corresponding categorized parameter value set and the corresponding target parameter value.

In Block 204, a determination is made as to whether the simulation is completed. If the determination is positive, i.e., the simulation is completed, the method proceeds to Block 208. If the determination is negative, i.e., the simulation is not yet completed, the method proceeds to Block 205.

In Block 205, a current core dataset is obtained prior to performing model computation for the simulation. In an example scenario where the model computation to be performed is for the initial simulation time point of the simulation, the current core dataset may be based on an initial condition of the simulation. In other words, an initial core dataset is obtained at the beginning of the simulation as the current core dataset. In another example scenario where at least one successful model computation has been completed for the simulation, the current core dataset is obtained from the latest successful model computation at the most recent simulation time point.

In one or more embodiments, the current core dataset is obtained during the same simulation from which the set of historical parameter values and the set of historical core datasets are obtained in Block 201 above. In other words, Block 201 and Block 204 are performed during the same simulation referred to as the current simulation.

In one or more embodiments, Block 201 is performed during a prior simulation and Block 204 is performed during a current simulation subsequent to and separate from the prior simulation.

In Block 206, a predicted parameter value of the runtime parameter is generated for achieving the simulation convergence during the current simulation. In particular, the predicted parameter value is a target value to achieve the simulation convergence for a current simulation time point, which immediately follows the most recent simulation time point from which the current core dataset is obtained. In one or more embodiments, the predicted parameter value of the runtime parameter is generated using the machine learning model and based on the current core dataset. For example, the current core dataset is compared to the categorized core datasets in the machine learning model to identify a closest match. In one or more embodiments, the closest match is identified using a statistical classifier based on the categorized core datasets. The target parameter value linked to the matched categorized core dataset in the machine learning model is then selected as the predicted parameter value.

In Block 207, the model computation is performed using the predicted parameter value of the runtime parameter and iterates till simulation convergence is actually achieved at the current simulation time point. Different types of runtime parameters may be used. For example, in one or more embodiments, the runtime parameter is the simulation time step used to compute the current simulation time point from the most recent simulation time point. Specifically, the most recent simulation time point is incremented by the predicted target value to determine a predicted simulation time point for the initial iteration of the modeling computation. By way of another example, in one or more embodiments, the runtime parameter is the solver tolerance. The predicted target value is used to configure the equation solver for the initial iteration of the modeling computation. By way of another example, in one or more embodiments, the runtime parameter is the variable change threshold. The predicted target value is used to define the simulation convergence for the initial iteration of the modeling computation.

In one or more embodiments, the runtime parameter value is adjusted during the model computation iterations leading to the actual simulation convergence. In other words, the final runtime parameter value used for the successful model computation iteration may differ from the predicted parameter value of the runtime parameter. For example, the actual simulation time point of the successful model computation iteration may differ from the predicted simulation time point for the initial iteration of the modeling computation. In other examples, the actual solver tolerance and/or variable change threshold used in the successful model computation iteration may differ from the predicted target values used in the initial iteration of the modeling computation. The method then returns to Block 202 where the final runtime parameter value used for the successful model computation iteration and the current core dataset are added to the training set.

In Block 208, a modeling result of the field is generated. In one or more embodiments, the results of the successful model computation (i.e., simulation output data) are aggregated over the sequence of simulation time points to generate the modeling result of the simulation. In one or more embodiments, a summary, statistic, conclusion, decision, plan, etc. is derived from the simulation output data as the modeling result of the simulation.

In Block 209, a determination is made as to whether any additional simulation is to be performed. If the determination is positive, i.e., another simulation is to be performed, the method proceeds to Block 205 to start the next simulation. If the determination is negative, i.e., no more simulation is to be performed, the method ends. As the method loops from Blocks 202, 203, 204, 205, 206, 207, and 208 through Block 209 multiple times before the method ends, multiple simulations are performed to complete one or more simulation studies.

FIG. 2.2 depicts an example method in accordance with one or more embodiments. For example, the method depicted in FIG. 2.2 may be practiced using the E&P computer system (118) described in reference to FIGS. 1.1 and 1.2 above. In one or more embodiments, one or more of the elements shown in FIG. 2.2 may be omitted, repeated, and/or performed in a different order. Accordingly, embodiments of runtime parameter selection in simulations should not be considered limited to the specific arrangements of elements shown in FIG. 2.2.

In Block 211, historical parameter values of a runtime parameter and a set of historical core datasets are obtained. In particular, the historical parameter values and the set of historical core datasets are used for a first simulation of the field. In addition, each historical parameter value results in a simulation convergence during the first simulation.

In Block 212, a machine learning model is generated based at least on the set of historical core datasets and the historical parameter values.

In Block 213, during a second simulation of the field, a current core dataset is obtained.

In Block 214, using the machine learning model and based on the current core dataset, a predicted parameter value of the runtime parameter is generated for achieving the simulation convergence during the second simulation.

In Block 215, using at least the predicted parameter value, the second simulation is completed to generate a modeling result of the field.

FIGS. 3.1 and 3.2 show an example in accordance with one or more embodiments. In one or more embodiments, the example shown in these figures may be practiced using the E&P computer system shown in FIGS. 1.1 and 1.2 and the method described in reference to FIG. 2 above. The following example is for explanatory purposes and not intended to limit the scope of the claims.

As described above, the runtime parameter engine is an intelligent selector for the runtime parameter value that builds a fingerprint of a simulation based on multiple realizations. The runtime parameter engine captures specific data of each successful model computation in each realization to store in the fingerprint. Each realization improves the accuracy of the selected target runtime parameter value as more information about the complexity of the fluid flow equations and boundary effects (such as wells) becomes available.

As described above, FIG. 3.1 shows the simulation time line (310) where a runtime parameter value (e.g., time step $t_{i+1}$) is determined upon a successful model computation at the time point $t_i$ to continue simulation for the next time point $t_{i+1}$. The runtime parameter value (e.g., size of the time step $t_i$) is related to the complexity of the model computation and the computing resources (e.g., computing time) for the model computation. Resource consumption chart (315) shows the cumulative computing resources consumed for the simulation as a function of the simulation time. The vertical axis of the resource consumption chart (315) corresponds to the cumulative computing resources consumed for the simulation (e.g., cumulative computing time of the simulation). The horizontal axis of the resource consumption chart (315) corresponds to the simulation time, which is shown using the same time scale as the simulation time line (310).

Selecting time step size based on the current and recent historical state of the simulation (e.g., simulated reservoir properties) is not well suited to predict a target time step size for sudden changes in the simulation input. These changes may occur when wells that are connected to the reservoir come online and/or are closed. Moreover, injection of fluids or other local physical effects may temporally increase the complexity of the flow equations. A target size of the time step is crucial to compute the solution in reasonable time. Technology in this area has become relevant in recent times as the size and complexity of the set of coupled equations has increased due to the desire and ability to model with increased resolution, whether in the complexity of the physical processes simulated (e.g., enhanced oil recovery) or in the spatial resolution of the subsurface volume. An example of selecting a target time step under sudden increases in computing complexity is described below.

The input value set (311) of the simulation specifies an open well injection of fluid at time point $t_3$, which increases the complexity of model computation and results in excessive iterations of unsuccessful model computation. After each iteration of unsuccessful model computation, the subsequent runtime parameter value (e.g., time step size) is reduced for the next iteration until the model computation is finally successful. Due to the excessive number of failed iterations, the runtime parameter value used for the final successful iteration (e.g., subsequent time step $t_4$) is substantially smaller than the runtime parameter value used for the previous time point (e.g., the previous time step $t_3$). Similar situation also occurs at time points $t_{10}$ and $t_{15}$ resulting from other complexity scenarios (312) and (313). The excessive number of iterations at time points $t_3$, $t_{10}$, and $t_{15}$ are reflected in the resource consumption chart (315) as abrupt increases of the cumulative computing resources. These abrupt increases of cumulative computing resources due to excessive number of failed model computing iterations are reduced by using the aforementioned machine learning model to determine the subsequent time step at each simulation time point.

As shown in FIG. 3.1, the core datasets (314) include multiple core datasets each corresponding to a simulation time point. In particular, each core dataset corresponding to the time point $t_i$ is represented as a tuple $\{\{X_i, D_i\}, \gamma_i\}$ or $\{\{X, D\}, \gamma\}_{ti}$, where X, D, and γ represent a continuous data vector, discrete data vector, and runtime parameter value, respectively. These core datasets are collected and stored in a fingerprint $F=\{\{\{X_1, D_1\}, \gamma_1\}, \ldots, \{\{X_n, D_n\}, \gamma_n\}\}$, which is included in a training set to generate the aforementioned machine learning model. The fingerprint F is shown in a matrix format in the core datasets (314). Specifically, $X_i$ and $D_i$ include continuous and discrete data elements captured from the model computation at time point $t_i$. In addition, $\gamma_i$ includes a runtime parameter value used in the final successful model computation iteration at time point $t_{i+1}$.

Examples of continuous data elements of the continuous data vector $X_i$ include, but are not limited to, reservoir pressures and temperatures, fluid composition, well oil and gas production/injection rates, mobility of reservoir fluids, mass and energy balance errors, etc. that are generated during the model computation at time point $t_i$. Each continuous data element may include a signed value or an absolute value associated with one or more grid cells of a core dataset, or a statistical measure representing a distribution of values across the core dataset.

Examples of discrete data elements of the discrete data vector $D_i$ include, but are not limited to, a number of nonlinear and/or linear solver iterations occurred during the model computation at time point $t_i$, a number of open wells included in the model computation at time point $t_i$, and additional modeling attributes of the model computation at time point $t_i$. The additional modeling attributes may specify a number of active and inactive grid cells, a number of fluid phases modeled, a number of components used in a fluid model (e.g., a three component oil/water/gas system for modeling black oil or n-component hydrocarbon and water mixtures), whether injection of a specific fluid is included in the model computation, whether heat transfer and temperature dependence is included in the model computation, etc.

Examples of the runtime parameter value $\gamma_i$ include, but are not limited to, the time step, solver tolerance, variable change threshold, etc. used in the final successful model computation iteration at time point $t_{i+1}$.

FIG. 3.2 shows a schematic diagram of improving simulation by capturing core datasets into a training set for the machine learning model. In particular, the simulation time line A (321), simulation time line B (322), and simulation time line C (323) are similar to the simulation time line (310) depicted in FIG. 3.1 above. Each of the simulation time line A (321), simulation time line B (322), and simulation time line C (323) represents a simulation of fluid flow in porous media using a particular input value set and referred to as a realization. Multiple realizations may be included in a simulation study to obtain an accurate prediction of the oil and gas production of a reservoir. For example, the simulation time line A (321), simulation time line B (322), and simulation time line C (323) correspond to the realization 1, realization 2, and realization 3, respectively. In addition, separate simulation studies may be performed for different reservoirs. Although the realization 1 and realization 2 are shown as contributing to the training set (320), the fingerprints of more than two realizations for multiple simulation studies may be included in the training set (320) for generating the machine learning model. For example, the fingerprint collected from the simulation time line A (321) is denoted as $F_1=\{\{\{X, D\}, \gamma\}_{t1}, \ldots, \{\{X, D\}, \gamma\}_{tm}\}$, and the fingerprint collected from the simulation time line B (322) is denoted as $F_2=\{\{\{X, D\}, \gamma\}_{t1}, \ldots \{\{X, D\}, \gamma\}_{tm}\}$. In general, the fingerprints collected over k realizations of m different simulation studies may be stored in the training set (320) and represented as $$\bigcup_i^m \bigcup_j^k F_{ji}$$

where $F_{ji}$ represents the fingerprint collected from the $i^{th}$ realization of the $m^{th}$ simulation study.

To improve the simulation of the realization 3, the subsequent time step $t_3$ for the simulation time line C (323) is determined by using the continuous and discrete data vectors $\{X, D\}_{t2}$ at time point $t_2$ as input to the machine learning model. A machine learning model (324) may be expressed as $T(\{X, D\}_{t_i}|SDB) \rightarrow \Delta t^{pred}$ where $T(\bullet)$ represents a runtime parameter value selection algorithm, $\{X, D\}_{ti}$ represents the core dataset at the current time point $t_i$, SDB represents the most recently updated training set, and $\Delta t^{pred}$ represents the predicted target time step for continuing the simulation to the next time point. The algorithm $T(\bullet)$ is a statistical classifier based on the updated training set SDB to identify the target time step $\Delta t^{pred}$. In particular, the statistical classifier selects the historical core datasets in the SDB that closely match the core dataset at the current time step. Accordingly, the target time step $\Delta t^{pred}$ is identified from the historical time steps of these closely matched historical core datasets. For example, the target time step $\Delta t^{pred}$ may be randomly selected from these historical time steps. In another example, the target time step $\Delta t^{pred}$ may be an average, median, geometric mean, or other statistical representation of these historical time steps.

The algorithm $T(\bullet)$ may be provided as a service to the modeling engine so that the modeling engine determines the time step by using the algorithm $T(\bullet)$ (or the machine learning model (324)) without directly querying the very large training set (320). This machine learning model (324) is updated each time new core dataset is added to the training set (320). The machine learning techniques are used to mine the data in the training set (320) and build the classifier that encompasses the algorithm $T(\bullet)$. For example, a tree ensemble classifier may be used. In the example of the time step selection, the fingerprint is applicable to realizations of a single simulation study and thus specific to a single grid, fluid composition and modeling options, distribution and type of wells, etc. that are modeled for the particular reservoir in the simulation study. This allows improved performance for the realizations of simulating the particular reservoir but is not applicable to other reservoirs with different 3D volume resulting in different formats of the core datasets.

In general, as more realizations of different simulations studies are run and new fingerprint data is added to the training set (320), the ability of the algorithm $T(\bullet)$ to predict a target time step based on knowledge of previous successful simulations increases, to the extent that the algorithm T(•) may replace existing time step selection heuristics within the modeling engine to achieve target runtime performance in the general simulation case.

Although the description of the example depicted in FIG. 3.2 above is based on selecting a target time step, other runtime parameter values (e.g., an target solver tolerance value, a target variable change threshold value, etc.) may also be determined using the machine learning model (324) in a similar manner as the target time step described above.

Embodiments of runtime parameter selection in simulations may be implemented on a computing system. Any combination of mobile, desktop, server, router, switch, embedded device, or other types of hardware may be used. For example, as shown in FIG. 4.1, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments may be implemented on a node of a distributed system that is connected to other nodes. By way of another example, embodiments may be implemented on a distributed computing system having multiple nodes, where each portion of an embodiment may be located on a different node within the distributed computing system. Further, one or more elements of the aforementioned computing system (400) may be located at a remote location and connected to the other elements over a network.

Although not shown in FIG. 4.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4.1. Further, the client device (426) may include and/or perform the entirety or a portion of one or more embodiments.

The computing system or group of computing systems described in FIGS. 4.1 and 4.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, no more than one authorized process may mount the shareable segment, other than the initializing process, at any given time.

Other techniques may be used to share data, such as the various data described in the present application, between processes without departing from the scope of runtime parameter selection in simulations. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 4.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4.1, while performing one or more embodiments, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments, A and B may be vectors, and comparing A with B involves comparing the first element of vector A with the first element of vector B, the second element of vector A with the second element of vector B, etc. In one or more embodiments, if A and B are strings, the binary values of the strings may be compared.

The computing system in FIG. 4.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 4.1 and the nodes and/or client device in FIG. 4.2. Other functions may also be performed using one or more embodiments of runtime parameter selection in simulations.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited by no more than the attached claims.

What is claimed is:

1. A method for performing a field operation of a field, comprising:
    obtaining, using at least one processor, a plurality of historical parameter values of a runtime parameter and a first plurality of historical core datasets, wherein the plurality of historical parameter values and the first plurality of historical core datasets are used for a first simulation of the field, and wherein each of the plurality of historical parameter values results in a simulation convergence during the first simulation;
    generating, using the at least one processor, a machine learning model based at least on the first plurality of historical core datasets and the plurality of historical parameter values;
    executing, using the at least one processor, a second simulation of the field to obtain a current core dataset;
    determining, using the at least one processor and a classifier of the machine learning model, a closest matched core dataset of the first plurality of historical core datasets with the current core dataset at a simulation time point;
    selecting, using the at least one processor, a predicted parameter value of the plurality of historical parameter values of the runtime parameter corresponding to the closest matched core dataset of the first plurality of historical core datasets, wherein
        the predicted parameter value comprises a time step for achieving a first simulation convergence from the simulation time point of the second simulation;
    generating, using the at least one processor, first output data during a first iteration associated with the first simulation time point of the second simulation;
    increasing, using the at least one processor and based on the time step, the first simulation time point of the second simulation to a second simulation time point of the second simulation;
    iterating, using the at least one processor, to achieve the first simulation convergence to generate second output data;
    generating, using the at least one processor, a modeling result of the field using the first output data and the second output data; and
    executing one or more of:
        generating, using the at least one processor, a multi-dimensional visualization of the modeling result on a display device, such that the multi-dimensional visualization facilitates predicting hydrocarbon content throughout portions of the field, and
        transmitting, using the at least one processor, a field control signal based on the modeling result to control at least one of a drilling equipment, an actuator, or a fluid valve disposed about the field.

2. The method of claim 1, further comprising:
    obtaining, subsequent to completing the second simulation and from the second simulation, a second plurality of historical core datasets corresponding to a plurality of predicted parameter values of the runtime parameter that are used for the second simulation, wherein each of the plurality of predicted parameter values results in the first simulation convergence during the second simulation, and wherein the plurality of predicted parameter values comprises the predicted parameter value;

adjusting, based at least on the second plurality of historical core datasets and the plurality of predicted parameter values, the machine learning model to generate an adjusted machine learning model; and facilitating, using the adjusted machine learning model, a second simulation convergence during a third simulation of the field, the second simulation convergence indicating a fluid flow condition at a third simulation time point of the third simulation.

3. The method of claim 2, further comprising:
storing, in a training set, the first plurality of historical core datasets in association with the plurality of historical parameter values and the second plurality of historical core datasets in association with the plurality of predicted parameter values, wherein the machine learning model is generated based on the training set.

4. The method of claim 1, wherein the first simulation and the second simulation simulate one or more reservoirs of the field based on one or more input value sets.

5. A system for performing a field operation of a field, comprising:
an exploration and production (E&P) computer system, comprising:
a computer processor;
memory storing instructions executed by the computer processor, wherein the instructions comprise functionality to:
obtain a plurality of historical parameter values of a runtime parameter and a first plurality of historical core datasets, wherein the plurality of historical parameter values and the first plurality of historical core datasets are used for a first simulation, and wherein each of the first plurality of runtime parameter values results in a simulation convergence during the first simulation;
generate a machine learning model based at least on the first plurality of historical core datasets and the plurality of historical parameter values;
execute a second simulation of the field to obtain a current core dataset;
determine, using a classifier of the machine learning model, a closest matched core dataset of the first plurality of historical core datasets with the current core dataset at a simulation time point;
select a predicted parameter value of the plurality of historical parameter values of the runtime parameter corresponding to the closest matched core dataset of the first plurality of historical core datasets, wherein
the predicted parameter value comprises a time step for achieving a first simulation convergence from the simulation time point of the second simulation;
generate first output data during a first iteration associated with a first simulation time point of the second simulation;
increase, based on the time step, the first simulation time point of the second simulation to a second simulation time point of the second simulation;
iterate a runtime parameter value of the runtime parameter to achieve the first simulation convergence to generate second output data;
generate a modeling result of the field using the first output data and the second output data; and
execute one or more of:
generating a multi-dimensional visualization of the modeling result on a display device, such that the multi-dimensional visualization facilitates predicting hydrocarbon content throughout portions of the field, and
transmitting a field control signal based on the modeling result to control at least one of a drilling equipment, an actuator, or a fluid valve disposed about the field; and
a repository for storing the machine learning model, the first plurality of historical core datasets, the plurality of historical parameter values, and the predicted parameter value.

6. The system of claim 5, wherein the instructions further comprise functionality to:
obtain, subsequent to completing the second simulation and from the second simulation, a second plurality of historical core datasets corresponding to a plurality of predicted parameter values of the runtime parameter that are used for the second simulation, wherein each of the plurality of predicted parameter values results in the first simulation convergence during the second simulation, and wherein the plurality of predicted parameter values comprises the predicted parameter value;
adjust, based at least on the second plurality of historical core datasets and the plurality of predicted parameter values, the machine learning model to generate an adjusted machine learning model; and
facilitate, using the adjusted machine learning model, a second simulation convergence during a third simulation of the field, the second simulation convergence indicating a fluid flow condition at a third simulation time point of the third simulation.

7. The system of claim 6, wherein the instructions further comprise functionality to:
store, in a training set, the first plurality of historical core datasets in association with the plurality of historical parameter values and the second plurality of historical core datasets in association with the plurality of predicted parameter values,
wherein the machine learning model is generated based on the training set.

8. The system of claim 7, wherein the machine learning model is generated using a modeling engine that determines the time step without directly querying the training set.

9. The system of claim 8, wherein data is mined from the training set to build the classifier comprised in the machine learning model.

10. The system of claim 9, wherein the classifier comprises a tree ensemble classifier.

11. The system of claim 5, wherein the first simulation and the second simulation simulate one or more reservoirs of the field based on one or more input value sets.

12. The system of claim 5, wherein the machine learning model is generated using statistical clustering of at least one or more core datasets comprised in the first plurality of historical core data sets to generate a category for the one or more core data sets.

13. The system of claim 12, wherein the category comprises a group of core datasets sharing a similarity determined by a machine learning technique used to generate the machine learning model.

14. The system of claim 5, wherein the time step is determined using a discrete data vector that is inputted into the machine learning model.

15. The system of claim 5, wherein the second simulation comprises a plurality of simulations at a plurality of simulation time points including the first simulation time point and the second simulation time point.

16. The system of claim 5, wherein the multi-dimensional visualization comprises one of:
   a 2-dimensional visualization, or
   a 3-dimensional visualization.

17. The system of claim 5, wherein the modeling result is generated based on an aggregate of output data obtained from a sequence of simulation time points of the second simulation including the first simulation time point and the second simulation time point.

18. The system of claim 5, wherein the second simulation is associated with one or more of:
   grid data of a reservoir at the field,
   fluid composition data of the reservoir at the field,
   well distribution data of the reservoir at the field, and
   well type data of the reservoir at the field.

19. The system of claim 5, wherein the classifier comprises a statistical classifier that identifies a target value of the runtime parameter for a subsequent simulation time point after the first simulation time point.

* * * * *